United States Patent
Futami et al.

(10) Patent No.: US 7,433,564 B2
(45) Date of Patent: Oct. 7, 2008

(54) OPTICAL DEVICE FOR OPTICAL COMMUNICATION

(75) Inventors: Fumio Futami, Kawasaki (JP); Shigeki Watanabe, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 64 days.

(21) Appl. No.: 10/852,203

(22) Filed: May 25, 2004

(65) Prior Publication Data

US 2005/0190432 A1  Sep. 1, 2005

(30) Foreign Application Priority Data

Feb. 26, 2004  (JP) .............................. 2004-050794

(51) Int. Cl.
G02F 1/00 (2006.01)
G02F 1/035 (2006.01)
G02F 1/01 (2006.01)
G02F 1/29 (2006.01)
G02B 6/44 (2006.01)
G02B 26/00 (2006.01)
G02B 26/08 (2006.01)

(52) U.S. Cl. .............................. 385/100; 385/1; 385/2; 385/3; 385/14; 385/101; 385/102; 385/103; 385/104; 385/105; 385/106; 385/107; 385/108; 385/109; 385/110; 385/111; 385/112; 385/113; 385/114; 359/237; 359/238; 359/298; 359/299

(58) Field of Classification Search ......... 385/100–114, 385/1–3, 14; 359/237–324
See application file for complete search history.

(56) References Cited

U.S. PATENT DOCUMENTS

| | | | | |
|---|---|---|---|---|
| 5,299,210 A | * | 3/1994 | Snitzer et al. .................. 372/6 |
| 5,907,645 A | * | 5/1999 | Dupont et al. ................. 385/3 |
| 6,335,819 B1 | * | 1/2002 | Cho et al. ................... 359/333 |
| 6,366,356 B1 | * | 4/2002 | Brosnan et al. ............. 356/477 |
| 6,804,428 B1 | * | 10/2004 | Garrett et al. ................ 385/24 |
| H2190 H | * | 6/2007 | Chen .......................... 398/189 |
| 2001/0021059 A1 | * | 9/2001 | Yariv .......................... 359/264 |
| 2001/0053165 A1 | * | 12/2001 | Wang et al. .............. 372/38.02 |
| 2002/0015212 A1 | | 2/2002 | Fujiwara et al. |

(Continued)

FOREIGN PATENT DOCUMENTS

JP  A-2002-77052  3/2002

(Continued)

OTHER PUBLICATIONS

A.M. Weiner, et al., "Programmable femtosecond pulse shaping by use of a Multi-[element liquid-crystal phase modulator", Optics Letters, vol. 5, No. 6, Mar. 1990.

(Continued)

*Primary Examiner*—Frank G Font
*Assistant Examiner*—Jerry Blevins
(74) *Attorney, Agent, or Firm*—Staas & Halsey LLP

(57) ABSTRACT

An optical phase modulator made of lithium niobate or the like phase-modulates the output light of a single-wavelength laser light source 20 that emits CW light, and the phase-modulated light is inputted to a dispersion medium 22. The positive chirp and negative chirp of light to which frequency chirp is applied by phase modulation draw near in the dispersion medium and an optical pulse is generated.

22 Claims, 15 Drawing Sheets

U.S. PATENT DOCUMENTS

| | | |
|---|---|---|
| 2002/0036812 A1* | 3/2002 | Bai .......................... 359/124 |
| 2002/0041618 A1 | 4/2002 | Watanabe et al. |
| 2002/0044723 A1 | 4/2002 | Hironishi |
| 2002/0159668 A1* | 10/2002 | Williams et al. ............... 385/3 |
| 2003/0231677 A1* | 12/2003 | Amparan et al. ......... 372/38.02 |
| 2004/0005110 A1 | 1/2004 | Leuthold et al. |
| 2004/0208543 A1* | 10/2004 | Weingarten .................. 398/47 |
| 2005/0013543 A1* | 1/2005 | Ionov .......................... 385/39 |

FOREIGN PATENT DOCUMENTS

| | | |
|---|---|---|
| WO | WO 02/17522 | 2/2002 |

OTHER PUBLICATIONS

M. J. Guy et al., "Generation of transform-limited optical pulses at 10 GHz using an electro-absorption modulator and a chirped fibre Bragg grating", Electronics Letters, vol. 31, No. 8, Apr. 1995.

E. Yoshida, et al., "Femtosecond Fiber Laser at 10 GHz and Its Application as a Multi-Wavelength Optical Pulse Source", IEICE Transactions C-I, vol. J80-C-I, No. 2, Feb. 1997.

Optical Electronics in Modern Communications, Fifth Ed., pp. 341, 342, 344, 346, and 348, Amnon Yariv, Oxford University Press. 1997.

Communication mailed from the European Patent Office on Nov. 27, 2007 related to the corresponding European patent application.

* cited by examiner

Application Principle of Multi-wavelength Light Source

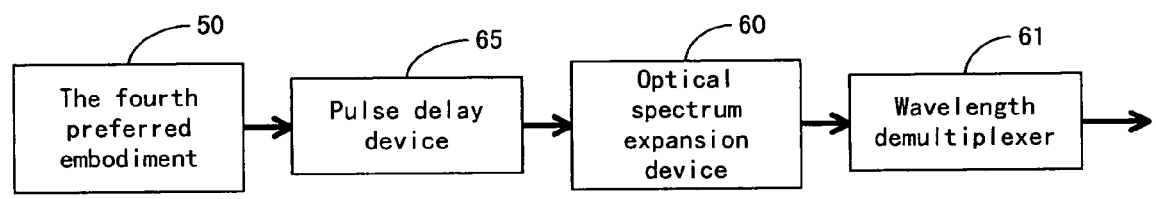
F I G. 1 5

OPTICAL DEVICE FOR OPTICAL COMMUNICATION

BACKGROUND OF THE INVENTION

1. Field of the Invention

The present invention relates to an optical device for optical communication, and more particularly to a method for generating data light with high duty rate, a device thereof and applications thereof.

2. Description of the Related Art

Currently in an optical fiber communication system, a wavelength-division multiplexing (WDM) multiplexing signal light whose bit rate per wavelength channel is 10 Gb/s or 40 Gb/s in a wavelength domain is put into practical use. The WDM system is characterized in that communication capacity can be easily increased by increasing the number of wavelengths. However, if the number of wavelengths increases, it becomes difficult to individually monitor/control all wavelength channels. There is also an optical time-division multiplexing (OTDM) system extending capacity by multiplexing data light with narrow pulse width against a bit interval though its bit rate is 10 Gb/s or 40 Gb/s, that is, data light with high duty rate in a time domain, as a multiplexing method that strikingly contrasts with the WDM multiplexing.

In a hybrid system of OTDM multiplexing and WDM multiplexing methods, when some capacity is realized, the required number of wavelengths decreases as the multiplicity of the OTDM multiplexing method is improved. Therefore, in this case, the problem of wavelength channel monitor/control is mitigated. Data light with high-duty rate is required to improve the multiplicity, and it is also important for data light source for OTDM multiplexing method to stably output data light with bit rate that accurately meets the requirements of the system.

FIGS. 1 through 3 show the configurations of the prior art.

As shown in FIG. 1, a data light source that stably outputs data light with bit rate that accurately meets the requirements of the system generally modulates by data using an intensity modulator 10. In the configuration where continuous light (CW) outputted from a CW light source 11 is modulated by data using the intensity modulator 10 driven by an electrical data signal, data light can be always generated in synchronization with the bit rate of a system. However, its duty rate is approximately 2, and it must be improved.

As shown in FIG. 2, although there is a configuration using an EA (electro-absorption) modulator as the intensity modulator, its duty rate is also at most 20 (see Non-patent reference 1). Furthermore, it has a problem that the optical signal-to-noise ratio (OSNR) of the generated data light greatly degrades in return for the improved duty rate.

However, if in order to generate data light with high duty rate, an optical clock is used in place of the CW light source, data light can be generated in accordance with the duty rate of the optical clock.

There is a mode-locking method as one of the technologies for generating an optical clock with high duty rate. In a configuration adopting the mode-locking method, as shown in FIG. 3, duty rate is improved by exciting a standing wave in a resonator composed of a gain medium, a wavelength selector and a modulator. More specifically, there are a mode-locked semiconductor laser and a mode-locked fiber laser as such a light source. For these light sources, see, for example, Non-patent reference 2. However, although the oscillation of data light by these mode locked lasers has an advantage of easily generating optical clocks with high duty rate, it has also a problem that its device configuration becomes complex and its size becomes large. Furthermore, the repetition frequency of an optical clock depends on the length of a resonator, and the length of the resonator fluctuates due to the change of an external environment and the fluctuations of temperature. Therefore, a large-scale stabilization device is indispensable for the stable generation of optical clocks.

So far the prior art for realizing a data light source with high duty rate has been described.

Non-patent reference 1: IEE Electron. Lett., vol. 31, page 671, 1995

Non-patent reference 2: Journal of The Institute of Electronics, Information and Communication Engineers, C-1, J80-C-1, page 70, February 1997.

As described above, the mode-locked clock light source can generate optical pulses with high OSNR and pulse width of pico-seconds or subpico-seconds. However, it is unrealistic as a light source that generates the above-described optical clock with an arbitrary and accurate frequency, from the practical point of view, such as a manufacturing technology, a product price, a device size and the like. Although the conventional method for applying an optical gate to CW light using an intensity modulator and generating data light can be easily realized by a configuration simpler than a mode locked laser pulse light source, it has a problem that it is difficult to generate optical pulses with high duty rate and the like.

Therefore, it is important to provide a method for generating data light which is an optical pulse with a high OSNR, pulse width of pico-seconds or subpico-seconds without being restricted by the bit rate of data, and Fourier transform limit (TL)(light pulse without frequency chirp), whose bit rate is 10 Gb/s or more and which can accurately and stably operate in arbitrary bit rate.

SUMMARY OF THE INVENTION

It is an object of the present invention to provide an optical device for generating stable data light with a high OSNR and narrow pulse width in an arbitrary bit rate.

The optical device of the present invention comprises a CW light generation unit generating CW light, a phase modulation unit modulating the CW light by phase and an optical pulse generation unit generating optical pulses by compensating for frequency chirp generated in the phase-modulated CW light by the phase modulation.

According to the present invention, since optical pulses are not directly generated by modulating by intensity, optical pulses whose pulse width is narrower than the operational limit of an electrical circuit can be generated. Since the present invention requires no cavity configuration when optical pulses are generated, stable optical pulses with narrow pulse width that are strong against the manufacturing limit of the cavity and an environmental change, such as a temperature change and the like can be generated.

By the present invention, the generation of data light with high duty rate and pulse width of pico-seconds or subpico-seconds without being restricted by the frequency of a modulation signal, whose control is easy, which accurately and stably operates in an arbitrary repetition frequency can be realized. The downsizing and cost reduction of a data light source device can be realized, and its reliability can be improved.

BRIEF DESCRIPTION OF THE DRAWINGS

FIG. 15 shows the configuration of the tenth preferred embodiment of the present invention.

DESCRIPTION OF THE PREFERRED EMBODIMENTS

The preferred embodiments of the present invention are described below with reference to the drawings.

Figure 1:
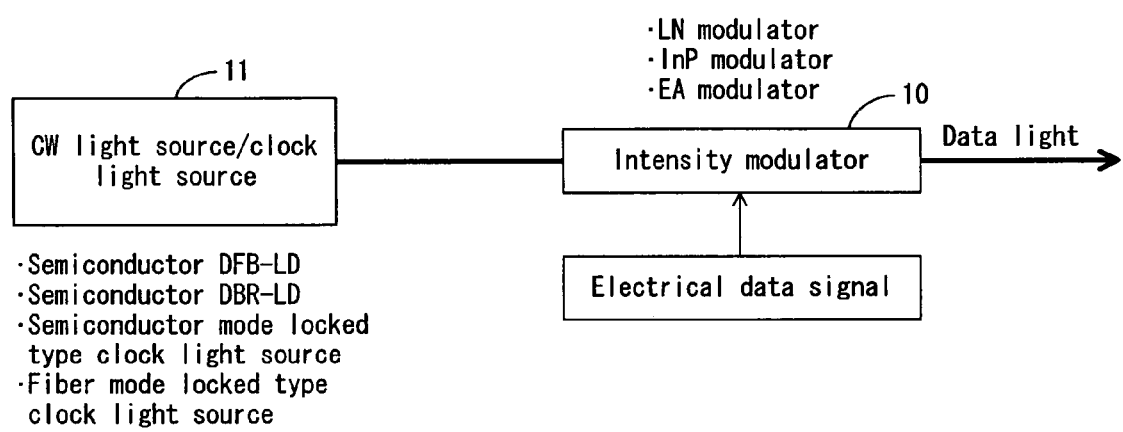
FIG. 1 shows the configuration of the prior art (No. 1)
Figure 2:
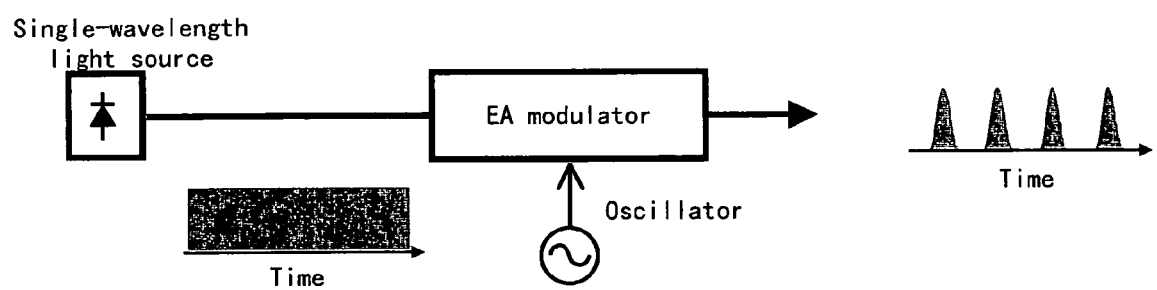
FIG. 2 shows the configuration of the prior art (No. 2)
Figure 3:
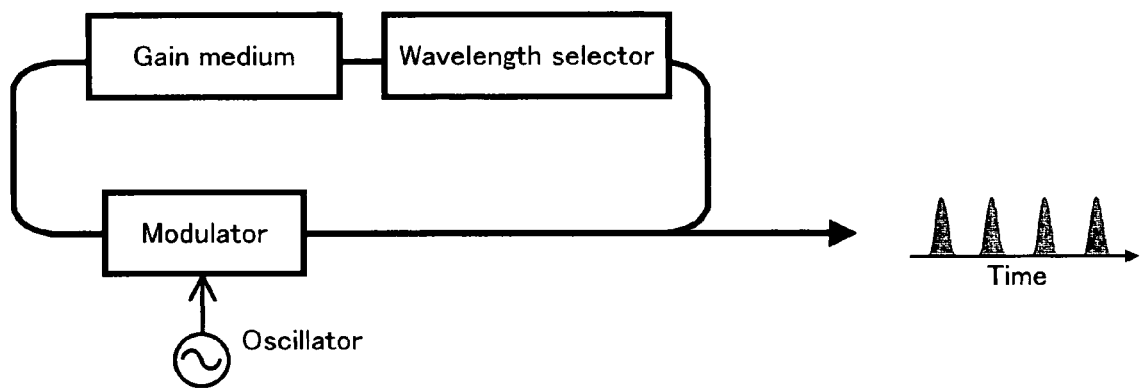
FIG. 3 shows the configuration of the prior art (No. 3)
Figure 4:
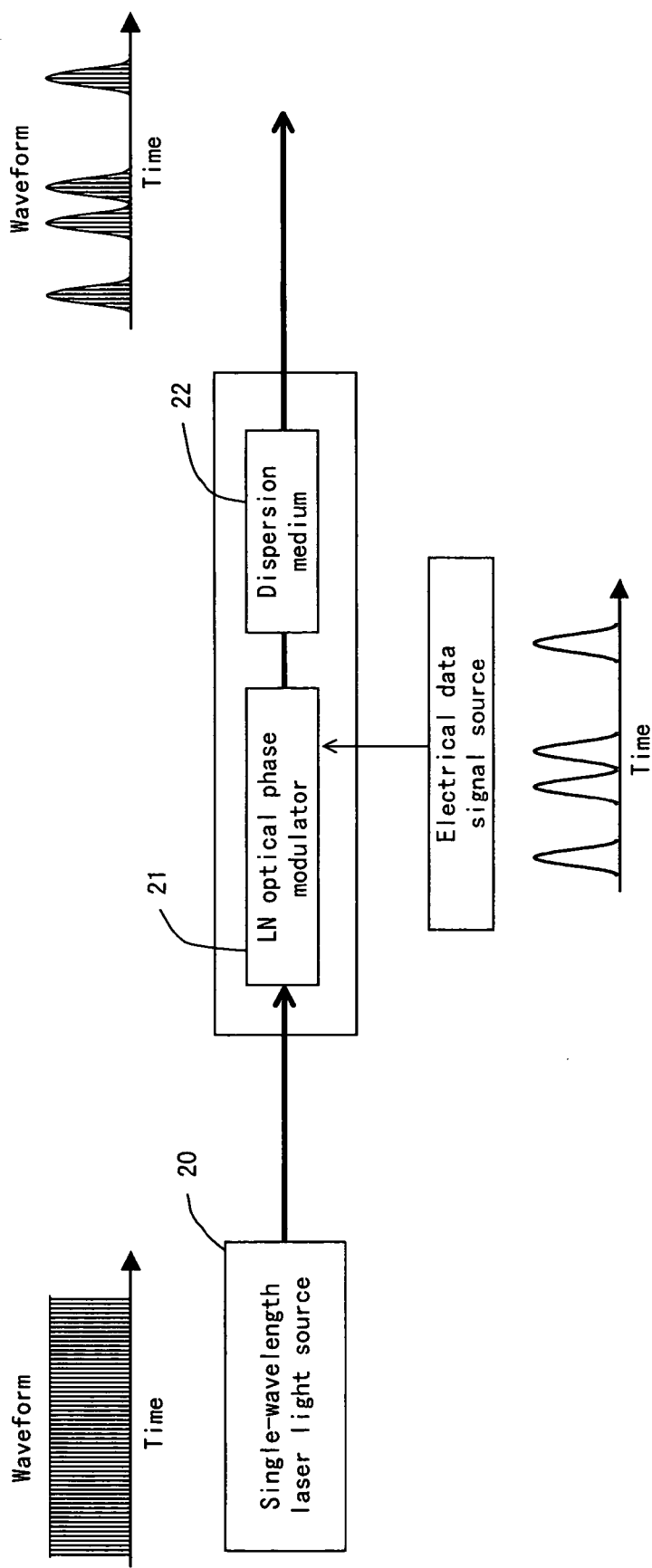
FIG. 4 shows the configuration of the first preferred embodiment of the present invention.

FIG. 4 shows the configuration of the first preferred embodiment of the present invention. FIG. 4 shows the configuration of a short-pulse data light source adopting a modulation method according to the first preferred embodiment of the present invention. An LN ($LiNbO_3$) optical phase modulator 21 applies frequency chirp to light outputted from a single-wavelength laser light source 20 by an electrical data signal. Then, if a dispersion medium 22 compensates for the frequency chirp, specifically adjusts the phase relationship of the light in such a way that its phase does not change on a time axis, a solitary wave (data light) can be obtained. For the single-wavelength laser light source 20, semiconductor DFB laser or DBR laser is used. The optical phase modulator induces frequency chirp to CW light. For the optical phase modulator, a 10-40 Gb/s electrical signal is used. For the compensator of frequency chirp, a single-mode optical fiber (SMF) or a dispersion-compensating fiber (DCF) is used. Alternatively, a liquid crystal space optical phase modulator can also be used. The liquid crystal space optical phase modulator can arbitrarily operate the phase of an optical spectrum in a frequency domain, and can independently control the phases of all optical frequency spectral components generated by a frequency chirp generation device. In other words, if it is controlled in such a way that all the phases of optical frequency spectral components are the same, a TL pulse that is specified by the envelope of the frequency spectral components in a time domain can be generated. The detailed operating principles of the liquid crystal space optical phase modulator are disclosed in a reference, "Opt. Lett. vol. 15, page 326, 1990".

For another component for compensating for frequency chirp, an AWG type optical phase modulator is used. The operation of this modulator is the same as that of the liquid crystal space optical phase modulator. In this case, a waveguide is formed on a silicon substrate, and light to which frequency chirp has been applied on the principles of a phased array antenna is Fourier-transferred into a frequency domain. Then, the phase of an optical frequency is operated on a Fourier plane. Then, by inverse-Fourier-transferring the light into a time domain, all the phases of frequency spectral components can be independently controlled.

If electrical data signals are all "1" or sine wave signals, optical clocks can be generated.

A method for modulating light by the above-described phase modulator using a parabola-shaped signal is also effective. This signal can be realized by an electrical circuit within the speed range up to approximately 10 GHz.

Figure 5:
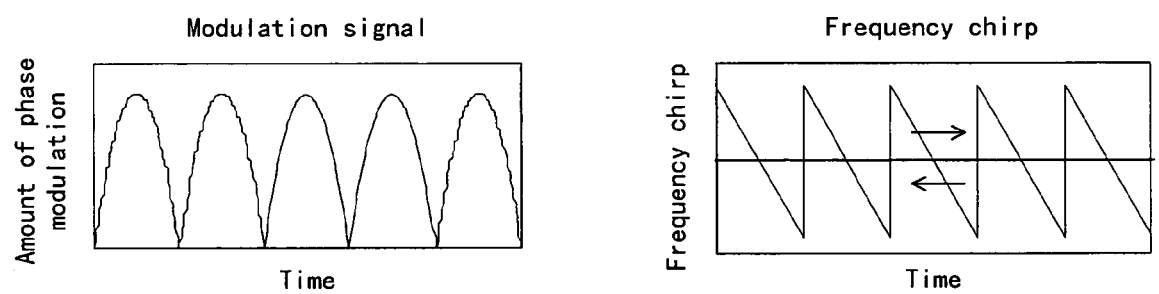
FIG. 5 shows phase modulation and frequency chirp.

FIG. 5 shows the phase modulation and frequency chirp.

If CW light is modulated by a parabola-shaped signal as shown on the left side of FIG. 5, linear frequency chirp is generated as shown on the right side of FIG. 5 since frequency chirp is defined by the amount of time change of a phase. This is because the frequency chirp is compensated for, as a TL pulse is generated if only an optical fiber is used as a dispersion medium in place of a liquid crystal space optical phase modulator or an AWG type optical phase modulator. However, if CW light to which frequency chirp has been applied as shown in FIG. 5 is transmitted through an optical fiber with appropriate dispersion, light to which frequency chirp located above the center line shown on the right side of FIG. 5 and light to which frequency chirp below the center line advance fast and slowly, respectively. Therefore, movement shown by arrow marks on the right side of FIG. 5 is generated in the CW light. Accordingly, a plurality of segments of light draw near thanks to the compensation of frequency chirp and the CW light transforms into a pulse shape.

In this preferred embodiment, the positional order between a mechanism for applying frequency chirp and a mechanism for compensating for the chirp can also be the reversal of that shown in FIG. 4.

Figure 6:
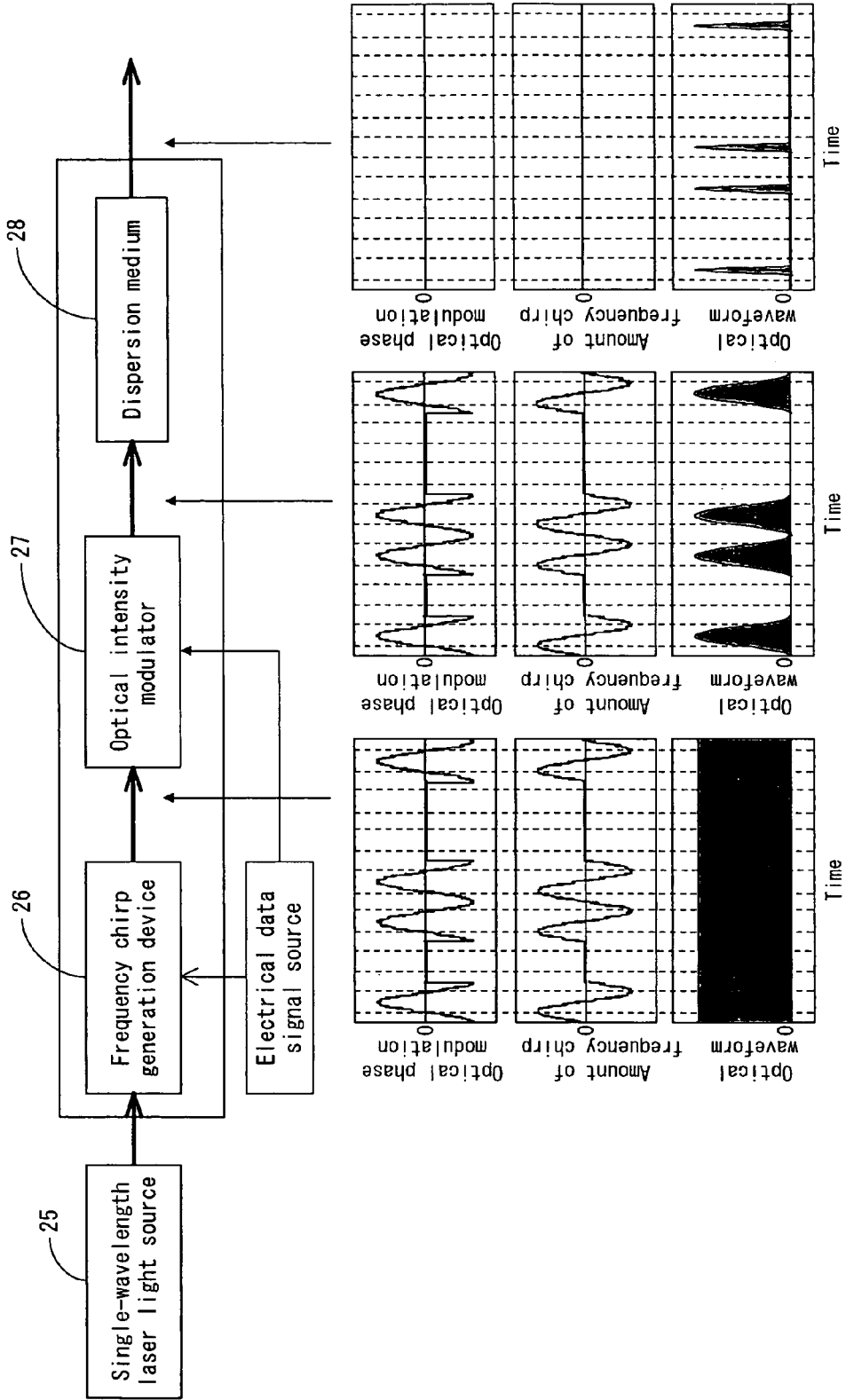
FIG. 6 shows the configuration of the second preferred embodiment of the present invention.

FIG. 6 shows the configuration of the second preferred embodiment of the present invention.

The single-wavelength laser light source 25 and frequency chirp generation device 26 are the same as those of the first preferred embodiment, respectively. An electrical data signal or sine wave signal with the same frequency as that of the electrical data signal applied to the optical phase modulator in order to generate frequency chirp is applied to an optical intensity modulator 27. Waveforms shown in FIG. 6 sequentially indicate the phase, frequency chirp characteristic and optical waveform of phase modulation light from top, and indicate the timing of an RF data signal to be applied to the optical intensity modulator and optical phase modulator. The optical intensity modulator is driven in the timing when the respective phases of the phase modulator and intensity modulator are the same (or reverse, that is, are shifted only by π). The bottom graph is an example of the modulation in the timing when the respective phases of the phase modulator and intensity modulator are the same. In this case, the optical intensity modulator applies a time gate only to the shaded part, and only linear frequency chirp is extracted. For the modulator for realizing this optical intensity modulation, an LN modulator with a Mach-Zehnder configuration or an InP modulator is used, but the modulator is not limited to these modulators. The chirp of an optical pulse whose frequency chirp is compensated for by a linear dispersion medium. By making the phases of all the frequency spectral components the same, the optical pulse becomes a TL pulse. For a dispersion medium 28, an optical fiber (single-mode fiber, dispersion-compensating fiber), a photonic crystal fiber, a chirp type fiber Bragg grading, a liquid crystal space optical phase modulator, an AWG type optical phase modulator or the like is used, but the medium is not limited to these.

The positional order between the optical phase modulator, optical intensity modulator and dispersion medium is not limited to that shown in FIG. 6, and an arbitrary order can be applied. If a hybrid modulator obtained by integrating the optical phase modulator and optical intensity modulator is adopted, the insertion loss of a modulator can be reduced, and optical pulses each with a better optical SNR characteristic can be generated.

Figure 7:
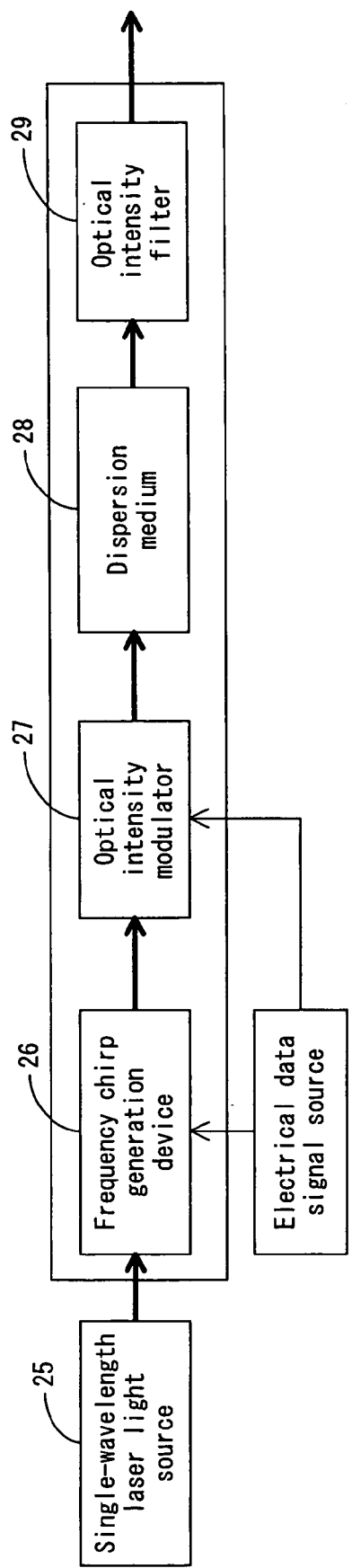
FIG. 7 shows the configuration of the third preferred embodiment of the present invention.

FIG. 7 shows the configuration of the third preferred embodiment of the present invention.

The waveform of data light to be calculated varies depending the application of a generated optical pulse. For example, in a communication system using an optical soliton, a Sech type waveform is needed. Light with an arbitrary pulse shape can be obtained by a function to control the intensity of a frequency spectrum. A method for realizing a data light source with this function is described below. Its configuration is shown in FIG. 7, and is the same as that of the second preferred embodiment except for an optical intensity filter 29. The optical intensity filter 29 can be realized by using a filter having a transmission characteristic for realizing a desired optical intensity spectral characteristic. For example, a dielectric multi-layered film type optical bandpass filter, an AWG type optical bandpass filter, a fiber Bragg grating optical bandpass filter, a Fabry-Perot type optical bandpass filter, a photonic crystal type filter or a liquid crystal space optical intensity modulator is used, but the filter is not limited to these filters. As to the positional order between the frequency chirp generation device, optical intensity modulator, frequency chirp compensator (dispersive medium) and optical intensity filter, any order can be applied as long as the optical intensity filter is located after the frequency chirp generation device and optical intensity modulator. The data light source can be realized by the above-described method even in any order other than that shown in FIG. 7. If electrical data signals are all "1" or sine wave signals, optical clocks can be generated.

Figure 8B:
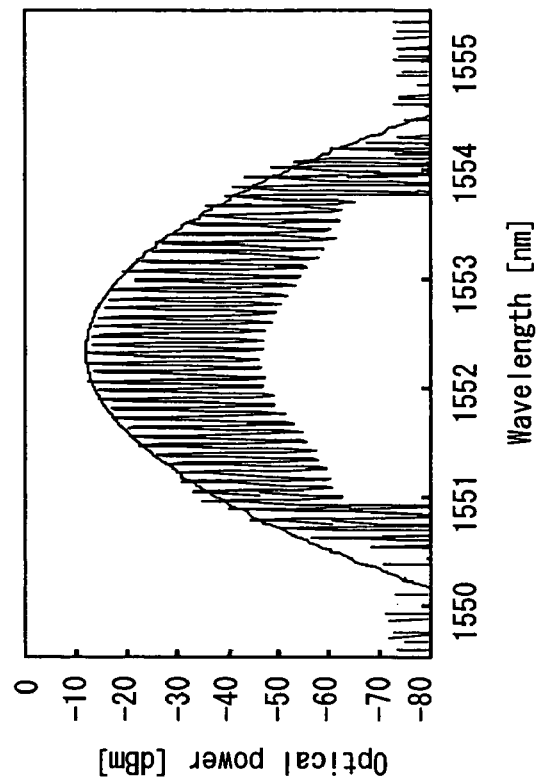
FIGS. 8A and 8B show the optical clock and its optical spectrum actually realized by the preferred embodiment.
Figure 8A:
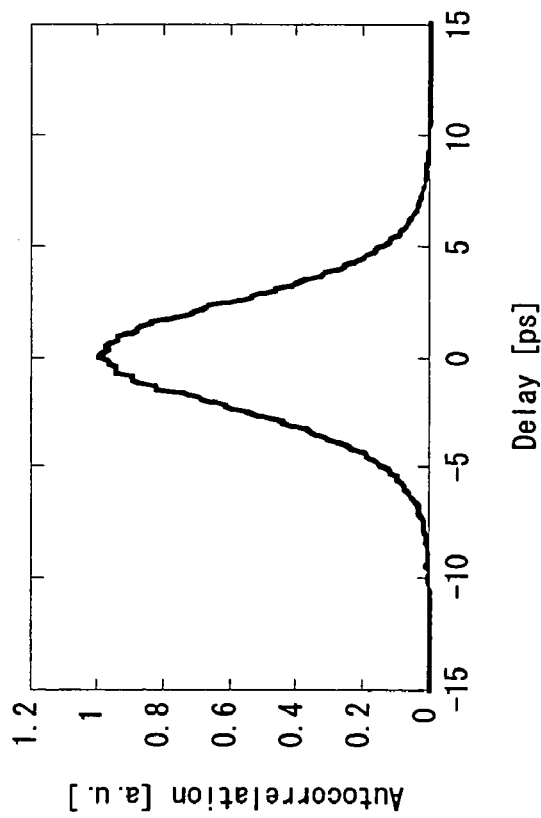

FIGS. 8A and 8B show the optical clock and its optical spectrum actually realized by this preferred embodiment.

More specifically, FIGS. 8A and 8B show the shape of a realized optical pulse and its optical spectrum, respectively. Firstly, the optical phase modulator generates frequency chirp by applying phase modulation with a modulation factor of 6.1π to CW light with a wavelength of 1,552.2 nm, and the optical intensity modulator transforms the CW light into a pulse by extracting only linear frequency chirp with the same phase as the phase modulator. Then, the dielectric multi-layered film type optical bandpass filter adjusts the intensity characteristic of its optical spectrum so as to take a Gaussian shape. Lastly, the phases of optical frequency spectral components are adjusted by a single-mode optical fiber with dispersion of 9.6ps/km, and a TL pulse with a pulse width of 3.8ps is realized at a 10 GHz repetition frequency. It is the amount of the frequency chirp generated the optical phase modulator that prevents the generation of a further shorter realized optical pulse, which restricts the bandwidth of the envelope of the optical frequency components. In other words, a pulse with further shorter pulse width can be generated by generating optical frequency spectral components with a broad bandwidth by the following methods.

1 Broader Optical frequency spectral components can be generated by applying larger amplitude of modulation electrical signals to the optical phase modulator.

2 A phase modulation index is increased by reducing the drive voltage of the optical phase modulator to generate broader optical frequency spectral components.

Figure 9:
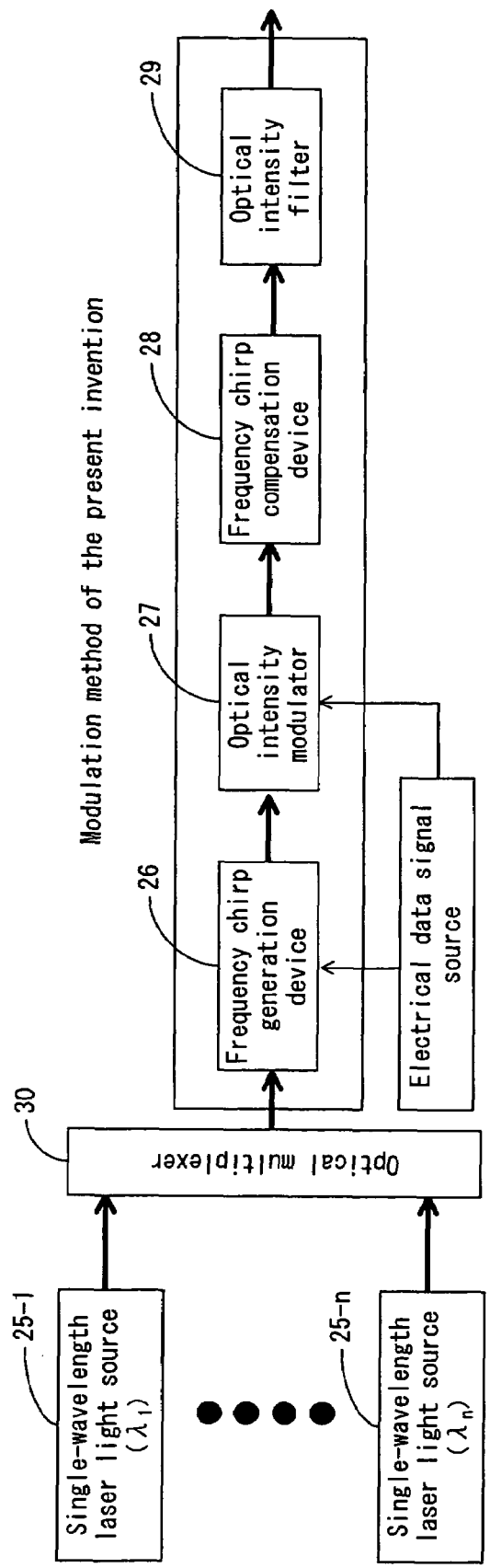
FIG. 9 shows the configuration of the fourth preferred embodiment of the present invention.

FIG. 9 shows the configuration of the fourth preferred embodiment of the present invention.

This is a method for setting all electrical data signals to "1" or using sine wave signals as electrical data signals, and simultaneously generating optical pulses with a multi-wavelength (wavelength: λn, number of wavelengths: n (n:positive integer, this is the same through the description below)). This method differs from the above-described one only in that the same number of single-wavelength laser light sources 25-1 through 25-*n* as the desired number (n) of multi-wavelength light sources are prepared and an optical multiplexer 30 multiplexes a plurality of segments of light outputted from these light sources. For the optical multiplexer 30, an AWG type optical multiplexer, an optical interleaver, an optical fiber multiplexer or the like is used, but the optical multiplexer is not limited to these. For the optical intensity filter 29, a filter with a plurality of transmission center frequencies, such as a Fabry-Perot type optical bandpass filter or the like is used, and one with one input port and one output port is effective when multi-wavelength pulse light is generated in one fiber. However, for example, if the optical modulator modulates multi-wavelength optical clocks generated in this preferred embodiment by data for each wavelength, an AWG type optical transmission filter is convenient for demultiplexing wavelengths.

By using polarization maintaining type components maintaining the polarization of light in the above-described preferred embodiments, stable pulse light source whose optical pulse characteristic is not degraded by polarization fluctuations that are generated by an external environmental change, a temperature change or the like, can be realized.

The preferred embodiments of optical clock applications realized by the above-described modulation methods are described below.

Figure 10:
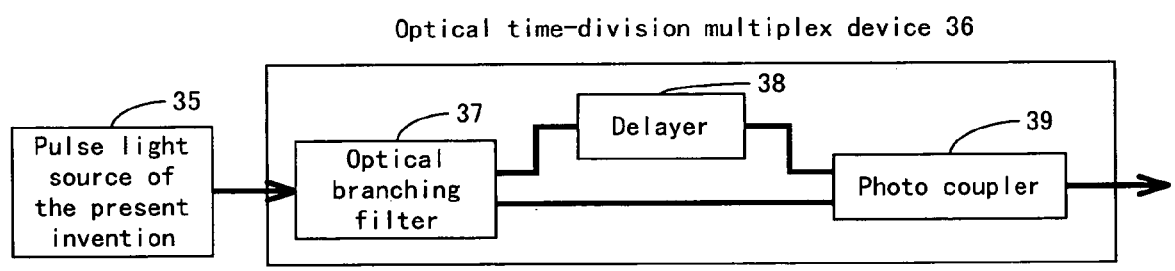
FIG. 10 shows the configuration of the fifth preferred embodiment of the present invention.

FIG. 10 shows the configuration of the fifth preferred embodiment of the present invention.

This is a method for realizing optical clocks with a high frequency (≧100 GHz) that cannot be directly generated in an electronic circuit. As shown in FIG. 10, this preferred embodiment generates 10 GHz or 40 GHz optical pulses and an optical time-division multiplexing device 36 multiplexes these pulses in a time domain. Firstly, an optical branching filter 37 branches an inputted optical pulse for two routes, a delayer 38 applies a delay to one route and then, a photocoupler 39 couples respective optical pulses that have been transmitted through the two routes, again. For the delayer 38, an optical fiber or a space type optical delay circuit is used, but the delayer is not limited to these. As an example, a method for doubling a repetition frequency is described. Firstly, 50 ps is applied to a 10 GHz optical pulse with a repetition frequency having an inter-adjacent interval of 100 ps. The inter-adjacent interval after multiplexing becomes 50 ps, and the repetition frequency is doubled to 20 GHz. In this way, the repetition frequency can be doubled and quadrupled. To make the intensity of the output pulse light constant, it is achieved by disposing an optical attenuator in one route and adjusting in such a way that the loss of one route may become the same as that of the other route. For the optical time-division multiplexing device 36, one in which a delay is applied to one route of a Mach-Zehnder interferometer, a Michelson interferometer or the like is used. By using a polarization maintaining type component, the polarization of an input optical pulse can be maintained. By timewise multiplexing an optical clock generated by the fourth preferred embodiment using this method, an optical clock with a multi-wavelength high frequency can be realized.

Figure 11:
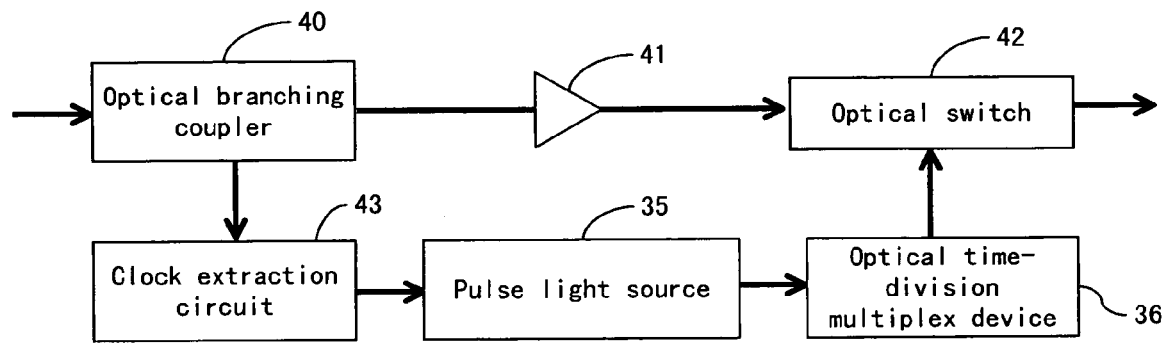
FIG. 11 shows the configuration of the sixth preferred embodiment of the present invention.

FIG. 11 shows the configuration of the sixth preferred embodiment of the present invention.

In order to apply 3R (re-amplification, re-timing and re-shaping) signal regeneration to high-speed (≧100 GHz) signal light exceeding the process speed limit of an electronic circuit, ultra-high-speed optical clock recovery is needed in addition to an ultra-high-speed optical switch. The configuration of a preferred embodiment for realizing 3R signal regeneration using the fifth preferred embodiment of the present invention is shown in FIG. 11. Firstly, an optical branching coupler 40 branches an ultra-high-optical signal (bit rate B (B≧100 Gb/s) into two signals. A clock extraction circuit 43 extracts an electrical clock (B/n) with speed that can be electrically processed from one branched signal light, and the pulse light source device 35 of the present invention is driven by the electrical clock. Then, the optical time-division multiplexing device 36 generates an optical clock with a high frequency by the method shown in the fifth preferred embodiment. The other signal branched by the optical branching coupler 40 is amplified by an optical amplifier 41 and is inputted to an optical switch 42. The other ultra-high-speed signal light branched by the optical branching coupler 40 switches this optical clock in the optical switch 42. Since the actually received optical signal is replaced with the generated optical clock thus, the 3R regeneration of an ultra-high-speed signal light can be realized. For the optical branching coupler 40, an optical fiber branching filter or the like can be used. After a time-division multiplexing circuit using an EA modulator converts the light signal into a low-speed (B/n) signal light, and the clock extraction circuit 43 extracts a clock in an electronic circuit. For the optical switch 42 for switching an ultra-high-speed optical clock, an optical Kerr switch, a non-linear optical loop mirror switch, an optical four-wave mixing switch or the like is used, but the optical switch is not limited to these.

Figure 12:
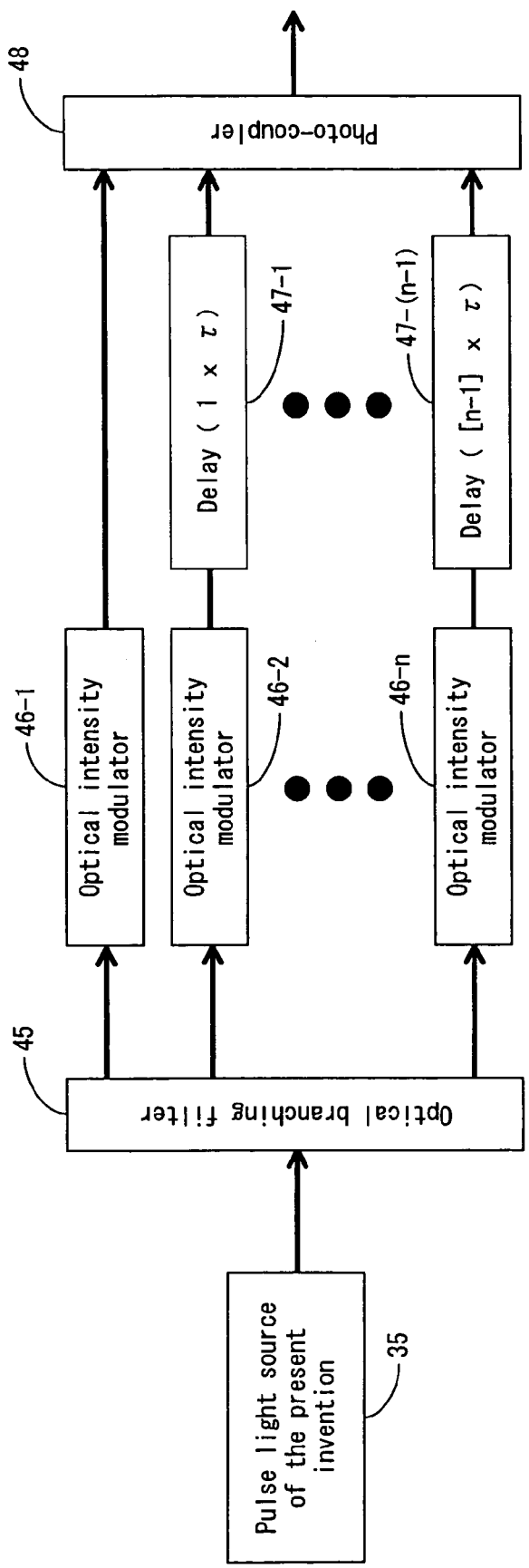
FIG. 12 shows the configuration of the seventh preferred embodiment of the present invention.

FIG. 12 shows the configuration of the seventh preferred embodiment of the present invention.

This is an application to a time-division multiplexing (OTDM) method to a transmitter. An optical branching filter 45 branches an optical pulse generated by the pulse light source 35 of the present invention into a plurality of optical pulses. In FIG. 12, an optical pulse is branched into n pulses. Each of optical intensity modulator 46-1 through 46-n puts a data signal on one branched optical pulse. Each of delayers 47-1 through 47-(n−1) applies an appropriate delay to each optical pulse signal modulated by data so that the optical pulse signals may not timewise overlap when a photo-coupler couples them, and then the photo-coupler 48 couples all the optical signal pulses. For example, if the repetition frequency and multiplicity of an optical pulse outputted by the pulse light source 35 of the present invention is 10 GHz and 16 (n=16), respectively, a delay time (T) of 6.25 ps is obtained. For the branching and coupling, an optical fiber branching filter and an optical fiber coupler, respectively, can be used. The data modulation can be realized by an LN modulator or an InP modulator. For the delay circuit, an optical fiber or space type optical delay circuit is used.

Figure 13:
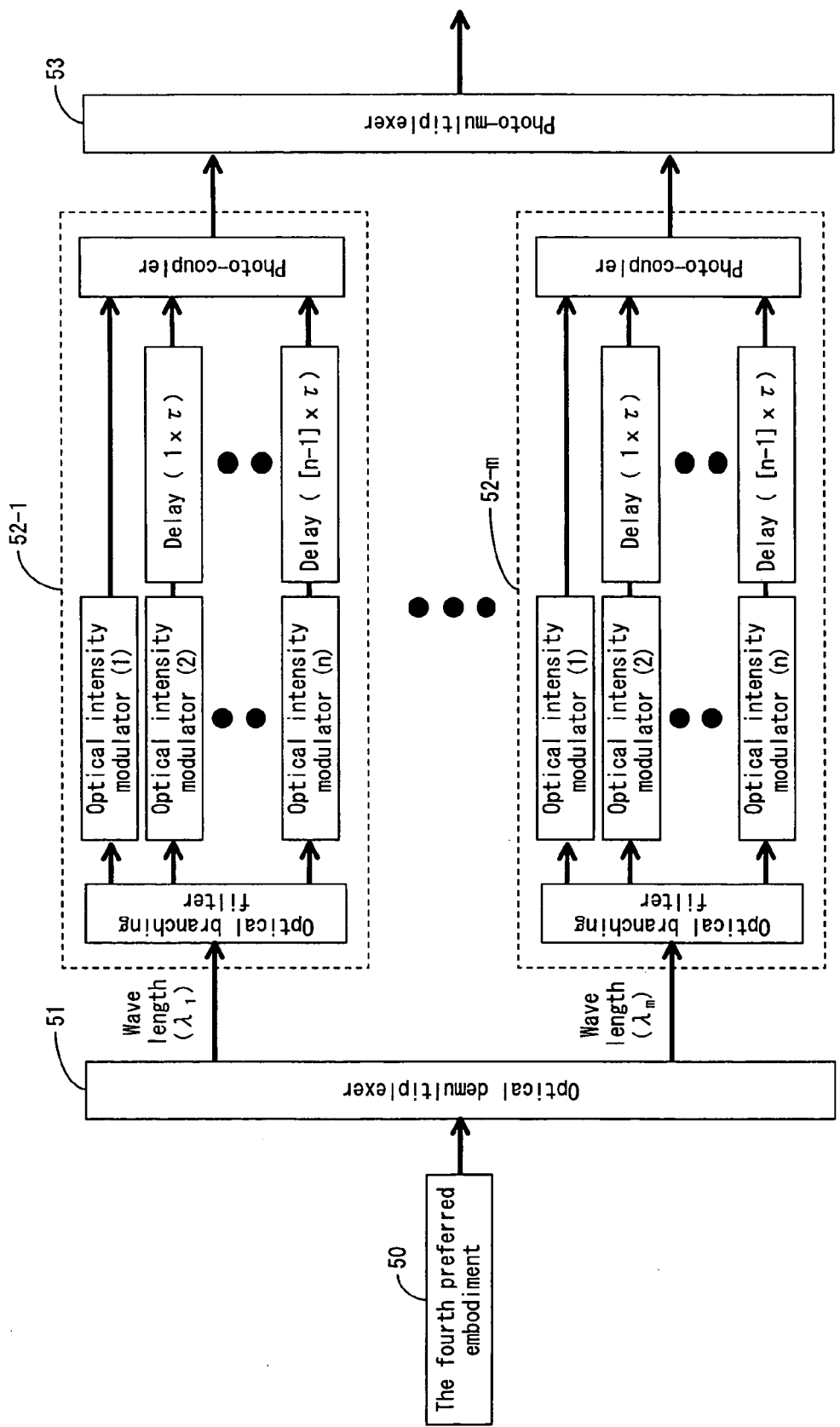
FIG. 13 shows the configuration of the eighth preferred embodiment of the present invention.

FIG. 13 shows the configuration of the eighth preferred embodiment of the present invention.

This realizes a multi-wavelength (number of wavelengths: m (m:positive integer)) OTDM transmitter. Firstly, an optical demultiplexer demultiplexes an optical pulse outputted from the multi-wavelength pulse light source 50 described in the fourth preferred embodiment for each wavelength. Each of blocks 52-1 through 52-m time-division multiplexes each optical pulse demultiplexed for each wavelength by the method described in the seventh preferred embodiment, and then an optical multiplexer 53 multiplexes them by wavelength again. For the optical demultiplexer 51/multiplexer 53, an AWG light filter or an interleaver is used.

Figure 14:
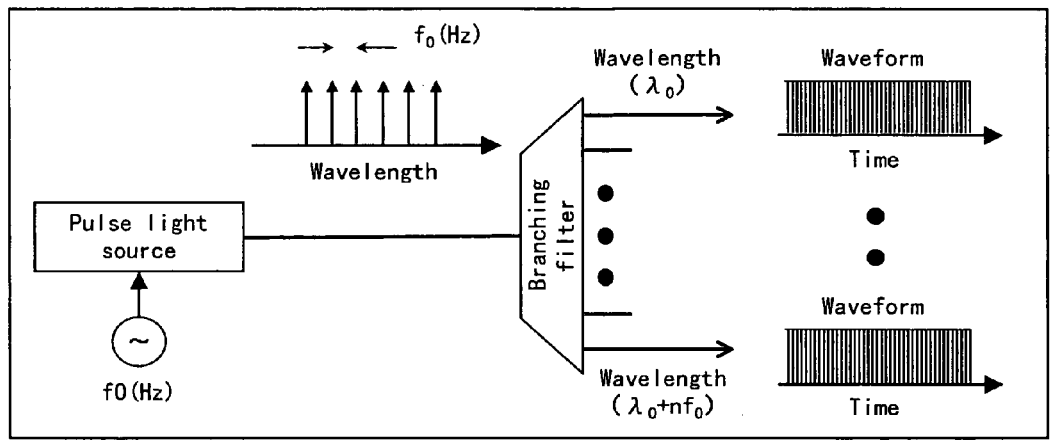
FIG. 14 shows the configuration of the ninth preferred embodiment of the present invention.
Figure 14:
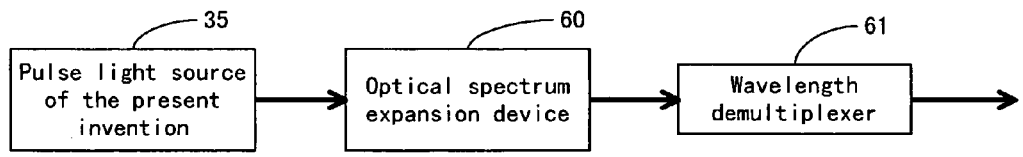

FIG. 14 shows the configuration of the ninth preferred embodiment of the present invention.

This uses the pulse light source 35 of the present invention as a multi-wavelength light source. As shown in the upper section, the optical spectrum of a pulse generated by the pulse light source is composed of a plurality of line spectra generated by modulation. The frequency interval between these line spectra coincides with the frequency of an electrical modulation signal. Therefore, for example, if a modulation frequency fo=25 GHz, modulation spectra are generated at intervals of 25 GHz. If each modulation spectral component is extracted in a wavelength domain, it becomes CW light in a time domain. Although the number of modulation spectral components depends on a phase modulation factor, it is restricted at most to several tens. In this preferred embodiment, an optical spectrum expansion device 60 expands the spectrum of an optical pulse and greatly increases the number. Then, a wavelength demultiplexer 61 extracts each modulation spectral component from the optical pulse whose spectrum has been expanded. The details of the spectrum expansion device 60 are disclosed in the already applied patent laid-open publication (No. 2002-77052). If the absolute wavelength of the CW light source is set to the wavelength specified for WDM signals in ITU-T and the modulation frequency is set to the frequency specified for WDM signals in ITU-T, a plurality of CW light sources for WDM signals can be realized by this preferred embodiment. This has an advantage that the absolute wavelength of each wavelength can be collectively controlled by only the absolute wavelength and modulation frequency of a CW light source in the pulse light source.

FIG. 15 shows the configuration of the tenth preferred embodiment of the present invention.

This uses a plurality of optical pulses each with a different wavelength and realizes a broader band multi-wavelength light source. More specifically, a plurality of optical pulses each with a different wavelength generated by the light source 50 on the fourth preferred embodiment are inputted to a pulse delayer 65. The spectrum expansion device 60 does not function if pulse waves timewise overlap. Therefore, the pulse delayer 65 applies a time difference to each optical pulse so that pulses with different wavelengths may not overlap. The time-division multiplex device described in the fifth preferred embodiment can realize this. In this case, the spectrum expansion device 60 expands the spectrum of an optical pulse with a different wavelength outputted from the pulse delayer 65, and a wavelength demultiplexer 61 extracts each modulation spectral component to transform the optical pulse into CW light.

In the preferred embodiment of the present invention, firstly, high-order modulation components are generated by applying frequency chirp whose phase changes on a time axis to CW light outputted from a laser light source. Then, the generated high-order modulation components are transformed into pulses by making the respective phases of the generated high-order modulation components the same. An optical intensity filter that adjusts the envelope of the optical spectra is used to generate an optical pulse with a desired waveform.

The effects obtained by the preferred embodiment of the present invention are shown in Table 1. Specifically, the preferred embodiment also has the features of a data light source obtained by combining a CW light source and an intensity modulator, and accordingly it can generate data light with high duty rate.

TABLE 1

|  | The present invention | CW light source + intensity modulator | Clock light source + intensity modulator |
|---|---|---|---|
| Configuration | ◎ Simple | ◎ Simple | X Complex |
| Duty rate | ◎ >100 @10 Gb/s | X 2~20 @10 Gb/s | ◎ >100 @10 Gb/s |
| Synchronization with external signal | ◎ Can be synchronized by oscillator | ◎ Can be synchronized by oscillator | Δ Fluctuations of resonator length |
| Jitter | ◎ Jitter of electrical data signal | ◎ Jitter of electrical data signal | Δ Fluctuations of resonator length on clock light source |
| Size | ◎ 19-inch rack, one step | ◎ 19-inch rack, one step | Δ 19-inch rack, five steps |

What is claimed is:

1. An optical device, comprising:
a continuous wave (CW) light generation unit generating continuous wave light;
a phase modulation unit modulating the CW light by phase; and
an optical pulse generation unit generating optical pulses by compensating for frequency chirp generated in the phase-modulated CW light by phase modulation, wherein
said phase modulation includes adjusting the phase relationship of the light, thereby allowing the phase relationship of the light to remain unchanged, and
the optical pulse generation unit draws a positive chirp and a negative chirp of the light, respectively, to generate the optical pulses.

2. The optical device according to claim 1, further comprising:
an intensity modulation unit modulating the phase-modulated CW light by intensity and extracting only linear frequency chirp.

3. The optical device according to claim 1, further comprising:
an optical spectrum adjustment unit adjusting an intensity shape of an optical spectrum of the optical pulse generated by said optical pulse generation unit and obtaining an optical pulse with a desired waveform.

4. The light source according to claim 3, wherein said optical spectrum adjustment unit is one of a dielectric multi-layered film type optical bandpass filter, an arrayed waveguide type optical bandpass filter, a fiber Bragg grating optical bandpass filter, a Fabry-Perot type optical bandpass filter, a photonic crystal type filter and a liquid crystal space optical intensity modulator.

5. The optical device according to claim 1, further comprising:
a delay unit branching the generated optical pulse and applying a time delay to each branched optical pulse; and
a multiplexing unit generating an optical pulse with a higher repetition frequency by multiplexing the delayed optical pulses.

6. An optical 3R regenerator, comprising:
a clock extraction unit extracting a clock from an optical signal that propagates through a transmission line;
said optical device according to claim 4 that operates according to the clock; and
a switch unit switching optical pulses outputted from said optical device, using the optical signal.

7. The optical device according to claim 1, further comprising:
an optical spectrum expansion unit expanding an optical spectrum of the generated optical pulse; and
a separation unit separating each modulation spectral component constituting the expanded optical spectrum and obtaining CW light.

8. The optical device according to claim 1, which comprises said CW light generation unit for each different wavelength, and both said phase modulation unit and optical pulse generation unit transform wavelength-multiplexed light obtained by multiplexing a plurality of segments of the CW light into an optical pulse.

9. The optical device according to claim 8, further comprising:
a wavelength demultiplexing unit demultiplexing the optical pulse composed of a plurality of optical pulses each with a different wavelength per each wavelength;
a delay unit branching each optical pulse demultiplexed for each wavelength and applying a time delay to each branched optical pulse;
a coupling unit generating an optical pulse with a higher repetition frequency by coupling differently delayed optical pulses; and
a wavelength multiplexing unit multiplexing a plurality of optical pulses each with a high repetition frequency.

10. The optical device according to claim 8, further comprising:
a wavelength demultiplexing unit demultiplexing the optical pulse composed of a plurality of optical pulses each with a different wavelength for each wavelength;
a wavelength delay unit applying a delay time different for each wavelength to each demultiplexed optical pulse for each wavelength; and
an optical spectrum expansion unit expanding an optical spectrum of each delayed optical pulse; and
a separation unit separating the expanded optical spectrum into each modulation spectral components and obtaining CW light.

11. The optical device according to claim 8, further comprising:
an intensity modulation unit modulating the phase-modulated CW light by intensity and extracting only linear frequency chirp.

12. The optical device according to claim 2 or 11, wherein said intensity modulation unit is either Mach-Zehnder modulator using lithium niobate or indium phosphorus as a material, or a liquid crystal space optical intensity modulator.

13. The optical device according to claim 8, further comprising:
an optical spectrum adjustment unit adjusting an intensity shape of an optical spectrum of the optical pulse generated by said optical pulse generation unit and obtaining an optical pulse with a desired waveform.

14. The light source according to claim 13, wherein said optical spectrum adjustment unit is one of a dielectric multi-layered film type optical bandpass filter, an arrayed waveguide type optical bandpass filter, a fiber Bragg grating optical bandpass filter, a Fabry-Perot type optical bandpass filter, a photonic crystal type filter and a liquid crystal space optical intensity modulator.

15. The light source according to claim 4 or 14, wherein said optical pulse generation unit is composed of polarization maintaining components.

16. The optical device according to claim 1, wherein the phase modulation generates data light using a data signal.

17. The optical device according to claim 1, wherein the phase modulation generates clock light using a clock signal.

18. The optical device according to claim 1, wherein said CW light generation unit is either DFB laser or DBR laser.

19. The optical device according to claim 1, wherein said phase modulation unit is either a lithium niobate modulator or an indium phosphorus modulator.

20. The optical device according to claim 1, wherein said optical pulse generation unit is one of an optical fiber, a photonic crystal fiber, a liquid crystal space phase modulator and an arrayed waveguide type phase modulator.

21. The light source according to claim 20, wherein said optical pulse generation unit is composed of polarization maintaining components.

22. An optical device, comprising:
- a phase modulation unit modulating a continuous wave (CW) light by phase;
- an optical pulse generation unit generating optical pulses by compensating for frequency chirp generated in the phase-modulated CW light by phase modulation; and
- an intensity modulation unit modulating the phase-modulated CW light by intensity and extracting only linear frequency chirp with the same phase as the phase modulation unit, wherein
- the optical pulse generation unit draws a positive chirp and a negative chirp of the light, respectively, to generate the optical pulses.

* * * * *